United States Patent [19]

Vogt et al.

[11] 4,261,877

[45] Apr. 14, 1981

[54] PREPARATION OF POLYURETHANE FROM A BLEND OF POLYETHER POLYOLS AND A GRAFT POLYOL WHICH IS THE PRODUCT OF POLYMERIZATION OF AN ETHYLENICALLY UNSATURATED MONOMER WITH A POLYOL WHICH CONTAINS UNSATURATION AND OXYALKYLENE MOIETIES

[75] Inventors: Herwart C. Vogt, Grosse Ile; Moses Cenker, Trenton; John T. Patton, Jr., Wyandotte; Bernardas Brizgys, Southgate, all of Mich.

[73] Assignee: BASF Wyandotte Corporation, Wyandotte, Mich.

[21] Appl. No.: 17,947

[22] Filed: Mar. 6, 1979

[51] Int. Cl.$^3$ .............................................. C08G 18/48

[52] U.S. Cl. .................................... 260/37 N; 525/63; 525/66; 525/125; 528/75; 528/76; 528/77

[58] Field of Search ........................... 525/63, 66, 125; 528/75, 76, 77; 260/37 N

[56] References Cited

U.S. PATENT DOCUMENTS 3,652,639  3/1972  Pizzini et al. ......................... 521/137

Primary Examiner—Maurice J. Welsh
Attorney, Agent, or Firm—Norbert M. Lisicki

[57] ABSTRACT

By using a polyether polyol grafted with a suitable proportion of a suitable vinyl-type monomer with the use of a free-radical catalyst, it is possible to obtain filled or unfilled castings of thermosetting polyurethane which has excellent physical properties as well as good processing characteristics.

14 Claims, No Drawings

PREPARATION OF POLYURETHANE FROM A BLEND OF POLYETHER POLYOLS AND A GRAFT POLYOL WHICH IS THE PRODUCT OF POLYMERIZATION OF AN ETHYLENICALLY UNSATURATED MONOMER WITH A POLYOL WHICH CONTAINS UNSATURATION AND OXYALKYLENE MOIETIES

BACKGROUND OF THE INVENTION

1. Field of the Invention

This invention relates to the making of polyurethane compositions, useful for making castings of noncellular, thermosetting polyurethane materials, and in particular, for the making of such castings which have excellent physical properties as well as good processing characteristics.

2. Description of the Prior Art

In the art of making polyurethane compositions, and in particular that of making of flexible polyurethane foams having improved load-bearing properties, it is known to use, for reaction with the polyisocyanate used in forming the polyurethane composition, a polyether polyol which is made by starting with an unsaturated polyol and grafting thereto, with the use of a free-radical catalyst, a proportion of units of ethylenically unsaturated monomer, such as acrylonitrile and/or styrene. Teachings of this sort may be found in U.S. Pat. No. 3,652,639. Example VIII of U.S. Pat. No. 3,652,639 describes the use of such an approach, even beyond the field of making flexible foams; it discloses the use of such an approach for the making of an elastomer composition.

In the art of constructing window frames, one prior-art practice is merely to make the frame of aluminum. This has the drawback that the frame readily conducts heat, thereby causing unwanted losses of heat to the exterior in cold weather and a corresponding drawback, with the heat flow in the opposite direction, during the summer air-conditioning season.

Noncellular, thermosetting polyurethane compositions have been made for use as castings, but in general, the mechanical and physical properties have been poor, especially if polymeric fillers are used.

To the applicants' knowledge, the prior art does not contain any teaching of how to provide a suitably strong, impact-resistant, thermosetting material with good handling characteristics, to serve as a heat barrier in the construction of window frames or the like, or in similar applications.

SUMMARY OF THE INVENTION

By using a polyether polyol grafted with a suitable proportion of a suitable vinyl-type monomer with the use of a free-radical catalyst in admixture with other polyols, it is possible to obtain filled or unfilled castings of thermosetting polyurethane which have excellent physical properties as well as good processing characteristics.

DESCRIPTION OF THE PREFERRED EMBODIMENTS

To explain in general terms the procedure for obtaining polyurethane products in accordance with the invention, one may begin with a polyfunctional initiator such as glycerol and alkoxylate it with a mixture of alkylene oxide (such as propylene oxide) and unsaturated compound containing oxirane oxygen (such as alkyl glycidyl ether) to obtain a "carrier polyol" or "backbone polyol". Next, the "carrier polyol" may be co-polymerized in a free-radical polymerization with a compound containing carbon-carbon unsaturation, such as styrene or acrylonitrile or mixtures thereof, to form a "graft polyol". Then, in the making of the final polyurethane product, there is a reaction of the "graft polyol", other polyols which are usually trifunctional or tetrafunctional, and one or more suitable polyisocyanates. Optionally, suitable filler material is also used as an unreactive component of the reaction mixture which results in the desired final polyurethane product. It is found that with such a procedure, better results (in terms of obtaining a final product with a desirable combination of strength and flexibility) are obtained when such a graft polyol is used than the results that are obtained if the graft polyol is replaced with an equal weight of a mixture of "carrier polyol" and a polymer or copolymer of compounds containing carbon-carbon unsaturation, and the "carrier polyol" and the other polymer or copolymer are present in the mixture to the same proportions by weight as the carrier polyol and the compounds containing carbon-carbon unsaturation were present in the reaction mixture by which the graft polyol was prepared.

The first step in the practice of the present invention is the making of a suitable unsaturated polyether polyol.

As one example of how this is done, allyl glycidyl ether in admixture with propylene oxide and an initiator, usually polyfunctional, is copolymerized to a molecular weight on the order of 500 to 10,000, thereby obtaining the desired unsaturated polyether polyol.

Then, for example, the unsaturated polyol (80 parts by weight) is reacted in the presence of a free-radical catalyst with styrene (12 parts by weight) and acrylonitrile (8 parts by weight), thereby producing a graft polyether polyol, such as one having a hydroxyl number of 28.

The next step is the blending of the graft polyol prepared above with other polyols, to produce a blend polyol suitable for reaction with a polyisocyanate to produce the desired thermosetting, castable polyurethane composition. As one example, this may be done by blending 200 parts by weight of a graft polyol such as the one with a hydroxyl number of 28 mentioned above with 120 parts by weight of a first polyol (pentaerythritol oxypropylated to an approximate hydroxyl number of 555) and 80 parts by weight of a second polyol (one based on ethylenediamine, oxypropylated to an approximate molecular weight of 450 and then given a final 10 percent cap of ethylene oxide—the hydroxyl number of the product being about 453). This produces a blend having a Brookfield viscosity of approximately 1040 centipoises at 100° F. The blend is preferably degassed (just prior to use) for about five minutes at 10 millimeters of mercury absolute pressure.

The next step in making compositions in accordance with the method of the invention is the reaction of the above-prepared blend with a suitable polyisocyanate. As one example, 400 parts by weight of the above-mentioned blend are thoroughly mixed with 271 parts by weight of polymethylene polyphenyl isocyanate to form a mixture having a pot life of approximately 4.25 minutes and a gel time of 4.5 minutes. For test purposes, the reaction mixture is, for example, poured into an aluminum mold which has been pre-treated with mold-release agent, and then post-cured in a circulating-air oven at 100° C. for one hour. Material prepared in this manner, after being stored under ambient conditions for three days, exhibited a tensile strength of 6000 pounds per square inch, 10 percent elongation, and a heat-distortion temperature of 181° F. under 66 pounds per square inch load (ASTM Designation D648, Test for Deflection Temperature of Plastics Under Flexural Load).

In comparison, the polyurethane material made from the same quantities of the same ingredients, except that the styrene and acrylonitrile are provided in the form of a finely powdered copolymer, instead of being chemically incorporated in a graft polyol, exhibited properties considerably poorer: a tensile strength of 3500 pounds per square inch, an elongation of 3.0 percent, and a heat-distortion temperature under the same load of 150° F. Although in both cases the pot life, the gel time, and the Shore D hardness (60) were the same, the Izod impact strength was higher (0.99 foot-pounds per inch notched and 6.5 foot-pounds per inch unnotched) for the material prepared from the graft polymer than for the comparison material made with the use of powdered styrene-acrylonitrile copolymer (0.36 foot-pounds per inch notched and 1.6 foot-pounds per inch unnotched, respectively).

Those skilled in the art will appreciate that unsaturated polyols other than those made by copolymerizing propylene oxide and allyl glycidyl ether may be used as a basis for forming the graft polyol. Equivalents of allyl glycidyl ether include other unsaturated epoxides (such as 1-vinylcyclohexane-3,4-epoxide and butadiene monoxide), as well as unsaturated polyhydric alcohols (such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol), and unsaturated polycarboxylic acids and anhydrides (such as maleic acid, maleic anhydride, fumaric acid, fumaric anhydride, crotonic acid, crotonic anhydride, propenyl succinic anhydride, and halogenated maleic acids and anhydrides). These materials may be co-reacted with propylene oxide, or they may be similarly co-reacted with other lower alkylene oxides such as ethylene oxide and butylene oxide singly, in sequence, or in mixtures. An important consideration in preparing an unsaturated polyol suitable for free-radical copolymerization with acrylonitrile and the like is that it is desirable to make a polyol of sufficiently low molecular weight that the material will remain liquid and easy to handle at working temperatures.

Because of its relatively low cost and ready availability, acrylonitrile is preferred, but those skilled in the art will appreciate that other ethylenically unsaturated monomers such as acrylonitrile substituted with one or more halogen atoms and/or lower alkyl or lower alkoxy radicals containing one to four carbon atoms may likewise be used.

In place of the styrene, any of a great number of ethylenically unsaturated monomers may likewise be employed. Examples include butadiene, isoprene, 1,4-pentadiene, 1,6-hexadiene, 1,7-octadiene, alpha-methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxylstyrene, methyl 4-vinylbenzoate, phenoxystyrene, p-vinyl diphenyl sulfide, p-vinylphenyl phenyl oxide, and the like; the acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl alpha-chloroacrylate, ethyl alpha-ethoxyacrylate, methyl alpha-acetaminoacrylate, butyl acrylate, 2-ethylhexyl acrylate, phenyl acrylate, phenyl methacrylate, alpha-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl chloroacetate, vinyl butyrate, isopropenyl acetate, vinyl formate, vinyl acrylate, vinyl methacrylate, vinyl methoxyacetate, vinyl benzoate, vinyl iodide, vinyl toluene, vinyl naphthalene, vinyl bromide, vinyl fluoride, vinylidene bromide, 1-chloro-1-fluoro-ethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethyl-mercaptoethyl ether, vinyl methyl ketone, vinyl ethyl ketone, vinyl phosphonates such as bis(beta-chloroethyl) vinylphosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like.

Hereinabove, the invention has been indicated as involving the reaction of the unsaturated polyether polyol with either an acrylonitrile-styrene mixture or a mixture in which the acrylonitrile or the styrene or both are replaced with various other named compounds or types of compounds. It is to be understood that one or more of such replacements may be used, and the replacement may be total or partial. Indeed, so far as the principle of the invention is concerned, either the styrene (or replacement for it) or the acrylonitrile (or replacement for it) may be entirely absent. As has been indicated, however, in the most usual case, the necessary unsaturated monomer(s) to be provided for reaction with the unsaturated polyol to form the graft polyol will be provided in the form of a mixture of acrylonitrile and styrene, and commonly with the acrylonitrile accounting for 20 to 60 percent of the total weight of the acrylonitrile plus styrene taken together. In general, the use of greater proportion of acrylonitrile leads to a final polyurethane product of greater strength and less flexibility.

The proportion of styrene-acrylonitrile or the like which is grafted into the unsaturated polyol may likewise be varied, for example, so as to amount to between 5 and 50 percent by weight of the graft polyol being made. The use of greater proportions of graft (i.e., styrene-acrylonitrile) usually leads to product polyurethanes of greater strength but slightly lower flexibility. Again, it is important in making the graft polyol to produce a product of sufficiently low molecular weight that the material remains liquid and can be handled at convenient working temperatures.

To the extent that other possible reactants, catalysts, process conditions, etc., including (in the case of reactants and catalysts) comprehensive but non-limiting lists of the various equivalent compounds, have not been discussed or recited herein, reference is made to U.S. Pat. No. 3,652,639, the disclosure of which is hereby incorporated by reference.

The other polyols that can be selected for mixture with the graft polyol to form the blend, and the relative proportions of such other polyols, between themselves, and between the total of them and the graft polyol, can also be varied. Those skilled in the art will appreciate that in the example indicated above, the other polyols selected for blending with the graft polyol are ones of relatively high functionality (both tetrafunctional) and they are added to the graft polyol in a substantial amount (amounting to slightly over 42 percent by weight of the final blended polyol for reaction with the polyisocyanate). The choices to be made in this respect are also dependent upon the nature of the polyisocyanate selected for use in making the final material. If it is more highly functional, then roughly equivalent results are obtained if the final blend which is to be reacted with it is somewhat less highly functional, and vice versa. In a general way, higher functionality is associated not only with greater strength and lesser flexibility, as mentioned above, but also with the shorter pot life. The problem of keeping the materials to be worked with liquid at working temperature is also not to be overlooked. Within the foregoing guidelines, those skilled in the art will understand how to select appropriate polyols and proportions thereof for blending with the graft polyol. In general, the "other polyols" added to the graft polyol are trifunctional or tetrafunctional polyols with hydroxyl numbers on the order of 300 to 1000, but suitable diols may in some cases be used, depending on the physical properties desired.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4-toluene diisocyanate and 2,6-toluene diisocyanate, hexamethylene diisocyanate, tetramethylene diisocyanate, 1,4-cyclohexane diisocyanate, hexahydrotoluene diisocyanate (and isomers), 1,5-naphthalene diisocyanate, 1-methoxy-2,4-phenylene diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyl-4,4'-diphenylmethane diisocyanate; the triisocyanates such as 4,4',4''-triphenylmethane triisocyanate, polymethylene polyphenylene polyisocyanate and 2,4,6-toluene triisocyanate; and the tetraisocyanates such as 4,4'-dimethyl-2,2',5,5'-diphenylmethane tetraisocyanate. Especially useful due to their availability and properties are toluene diisocyanate, 4,4'-diphenylmethane diisocyanate and polymethylene polyphenylene polyisocyanate. Polymethylene polyphenylene polyisocyanate is a product which results from the phosgenation of an anilineformaldehyde condensation product; it is sometimes called "crude MDI".

The foregoing discussion has concerned only the production of unfilled polyurethane materials, but the present invention is not necessarily limited thereto. Although it is generally known that the addition of a filler will detract from the mechanical properties of the product material, it is true that because of the increased strength which may be obtained by following the above teachings concerning the making of a castable, noncellular polyurethane composition, it will be possible in some instances to obtain materials which are, though filled, nevertheless of adequate strength for the intended purpose and have a strength greater than that of other castable polyurethane materials containing the same proportion of the same filler.

Suitable fillers include materials such as finely powdered copolymers of styrene and acrylonitrile, calcined aluminum silicate, and titanium dioxide. Carbon black, known as a conventional filler material, tends to yield unsatisfactory results, in that the viscosity of the resulting polyurethane material is too high, and it must be trowelled, rather than being cast.

The polyurethane compositions, filled or unfilled, made in accordance with the above teachings have a pot life (on the order of 4.5 minutes) such that they may be cast into desired shapes, hardening quickly, and then developing, as a result of a subsequent heating or curing step, a desired combination of high strength and adequate flexibility (as indicated by the values in the elongation test) and adequate impact strength (as determined in notched and unnotched Izod tests).

Among the conceivable uses for polyurethane compositions of the kind hereinabove indicated, one is the formation of heat-flow barrier members in the construction of metal window frames. Although it has been known, for example, to make a window frame for a double-glazed window from an extrusion or casting of solid aluminum, such that the frame provides an uninterrupted path for the conduction of heat from the inside to the outside or vice versa, those skilled in the art appreciate this is not an ideal situation. Nevertheless, it has been difficult to find a material having the necessary combination of strength, flexibility, resistance to impact, and insulating value that could be used to provide a barrier to the flow of heat in the making of such frames. It has now been discovered, however, that polyurethane compositions made in accordance with the present invention are satisfactory for such an application. In some instances, it is convenient and proper to produce a window frame in accordance with a practice involving applying the castable polyurethane composition made in accordance with the teachings of this invention to a window-frame casing or extrusion while it is still all in one single web or piece and arranged to provide a channel within which a suitable quantity of the polyurethane material may be received, and then, after the polyurethane material has been introduced and hardened by subsequent heat treatment, to sever the web at the bottom of the channel, thereby obtaining an integral piece of material in strip form, but with the hardened polyurethane material serving as a barrier to the flow of heat from one of the parts of the frame to the other and at the same time serving as a fastener to retain the two aluminum parts together. To ensure that the polyurethane serves to hold the two parts together, it is usual to design the window frame so that it has knobs or projections which become imbedded in the polyurethane material which is introduced to the above-mentioned channel. It is customary to produce window-frame members of the kind indicated above (the ones completely of aluminum) in the form of strips approximately 12 or 20 feet long; these are cut to the desired length at the site of construction. Strength, impact strength, and elongation are important properties in this application, since such strips do not always receive careful handling between when they are produced and when they are cut to length at the job site.

In the examples that follow, the following polyols are employed:

Polyol A—a polyol having a hydroxyl number of 33 and an oxyethylene content of 15 percent by weight prepared by capping with ethylene oxide a propylene oxide/allyl glycidyl ether heteric adduct of a mixture of glycerine and propylene glycol.

Polyol B—a polyol which has a hydroxyl number of 50 and is a glycerol/propylene oxide adduct to which there has first been added an internal block of oxyethylene units to the extent of 9 percent by weight of said polyol and then a terminating heteric block of oxypropylene units and units derived from allyl glycidyl ether.

Polyol C—a graft polyol prepared by the copolymerization of 20 percent by weight of a 2:3 mixture of acrylonitrile and styrene in Polyol A.

Polyol D—a graft polyol prepared by the polymerization of 20 percent by weight of acrylonitrile in Polyol A.

Polyol E—a graft polyol prepared by the copolymerization of 20 percent by weight of a 1:1 mixture of acrylonitrile:styrene in Polyol B.

Polyol F—a graft polyol prepared by the copolymerization of 30 percent by weight of a 3:1 mixture of acrylonitrile:styrene in Polyol B.

Polyol G—a graft polyol prepared by the copolymerization of 30 percent by weight of a 3:1 mixture of acrylonitrile:styrene in Polyol A.

In the following examples, all parts are by weight unless otherwise indicated.

EXAMPLE 1

In a clean, dry, two-pint paint can, there were thoroughly blended 120 grams of a polyol based upon pentaerythritol, oxypropylated to an approximate molecular weight of 400 (hydroxyl number 555), 80 grams of a second polyol having a hydroxyl number of 453 and being a tetrafunctional polyol with a molecular weight of about 500, based upon ethylenediamine, which was first oxypropylated and then given a final ten percent cap of ethylene oxide, and 200 grams of Polyol C. The resulting mixture had a Brookfield viscosity of 1040 centipoises at 100° F. It was degassed for approximately five minutes at 10 millimeters of mercury absolute pressure, to obtain a polyol blend suitable for reaction with the polyisocyanate.

To the above-mentioned blend, there were then added 271 grams of polymethylene polyphenylene polyisocyanate. The mixture was again thoroughly blended. For test purposes, the material thus obtained was poured into an aluminum mold (⅛×14×14 inches) pretreated with a mold-release agent. The mixture of blend and polyisocyanate had a pot life of approximately 4.25 minutes and a gel time of 4.5 minutes. From the mold there was removed a sample, which was post-cured in a circulating-air oven at 100° C. for one hour, and then stored under ambient conditions for three days, before the determination of the physical properties. See Table I below, where the physical properties are compared with those of material made (Comparison Test A) from the same ingredients in the same proportions, but with the styrene and acrylonitrile being present in the form of a styrene-acrylonitrile copolymer, rather than being present as a part of a graft polyol.

COMPARISON TEST A

Example 1 was repeated, except that in place of using 200 grams of Polyol C, there were used 160 grams of Polyol A and 40 grams of a copolymer of styrene and acrylonitrile, one containing 60 weight percent of styrene and 40 weight percent of acrylonitrile. As before, the blend was mixed with polymethylene polyphenylene polyisocyanate; the mixture molded, cured, stored, and tested. The results of tests to determine physical properties are presented below in Table I.

TABLE I

|  | Example 1 | Comparison Test A |
|---|---|---|
| Tensile strength, psi. | 6000 | 3500 |
| Elongation, % | 10.0 | 3.0 |
| Hardness, Shore D | 60 | 55 |
| Izod impact, ft.-lbs. per inch, notched | 0.99 | 0.36 |
| Izod impact, ft.-lbs. per inch, unnotched | 6.5 | 1.6 |
| Heat-distortion temp., 66 psi. load, °F. | 181 | 150 |

EXAMPLE 2

Example 1 was repeated, except that 200 grams of Polyol D replaced the Polyol C, and 273 grams of polymethylene polyphenylene polyisocyanate were used, instead of 271. The pot life was 4.5 minutes and the gel time was 5 minutes. Physical properties were determined as before, with the results being reported hereinbelow in Table II, which shows also the corresponding results when polyacrylonitrile is added separately, rather than being grafted into one of the polyols.

COMPARISON TEST B

Example 2 was repeated, with the exceptions that in place of the Polyol C there were used 160 grams of Polyol A plus 40 grams of acrylonitrile homopolymer. Once again, the pot life was 4.5 minutes and the gel time was 5 minutes. The physical properties are indicated below in Table II, which again demonstrates the superiority of proceeding by having the acrylonitrile grafted into one of the polyols, rather than having a corresponding amount of polyacrylonitrile added separately.

TABLE II

|  | Example 2 | Comparison Test B |
|---|---|---|
| Tensile strength, psi. | 6100 | 4800 |
| Hardness, Shore D | 64 | 60 |
| Elongation, % | 11.2 | 2.0 |
| Izod impact, ft.-lbs. per inch, notched | 0.54 | 0.64 |
| Izod impact, ft.-lbs. per inch, unnotched | 7.6 | 2.1 |
| Heat-distortion temp., 66 psi. load, °F. | 177 | 148 |

EXAMPLE 3

Example 1 was repeated, except that in place of the Polyol C, there were used 200 grams of Polyol E. Another exception is that 278 grams of polymethylene polyphenylene polyisocyanate were used, in place of 271 grams. The pot life and gel time were 4.5 minutes each. The physical properties are presented below in Table III.

COMPARISON TEST C

Example 3 was repeated, except that instead of using 200 grams of Polyol E, there were used 160 grams of Polyol B and 40 grams of a copolymer of equal weight percentages of styrene and acrylonitrile. The pot life and the gel time were the same as for Example 3. The physical properties are reported below in Table III.

TABLE III

|  | Example 3 | Comparison Test C |
|---|---|---|
| Tensile strength, psi. | 6000 | 4900 |
| Elongation, % | 16.9 | 2.5 |
| Hardness, Shore D | 45 | 71 |
| Izod impact, ft.-lbs. per inch, notched | 0.90 | 0.36 |
| Izod impact, ft.-lbs. per inch, unnotched | 8.0 | 2.0 |
| Heat-distortion temp., 66 psi. load, °F. | 175 | 194 |

EXAMPLE 4

Example 1 was repeated, except that there were used 276 grams of polymethylene polyphenylene polyisocyanate and there were used 200 grams of Polyol F. The pot life was 3.75 minutes and the gel time was 4 minutes. The results of the physical-property tests are presented below in Table IV.

COMPARISON TEST D

Example 4 was repeated, except that there were used 278 grams of polymethylene polyphenylene polyisocyanate, and in place of the Polyol F, there were used 160 grams of Polyol B and 40 grams of a polymerized 3:1 mixture of acrylonitrile:styrene. The pot life was 3.75 minutes, and the gel time was 4 minutes. The physical properties are presented below in Table IV.

TABLE IV

|  | Example 4 | Comparison Test D |
|---|---|---|
| Tensile strength, psi. | 6300 | 4300 |
| Elongation, % | 9.8 | 1.0 |
| Hardness, Shore D. | 61 | 62 |
| Izod impact, ft.-lbs. per inch, notched | 0.98 | 0.36 |
| Izod impact, ft.-lbs. per inch, unnotched | 6.1 | 2.0 |
| Heat-distortion temp., 66 psi. load, °F. | 196 | 184 |

EXAMPLE 5

Following the procedure indicated in Example 1, there were mixed 75 grams of a first polyol, being a tetrafunctional polyol with a molecular weight of about 500, based upon ethylenediamine, which is then oxypropylated and given a final ten percent cap of ethylene oxide; 165 grams of a second polyol, being one based upon glycerine which has been oxypropylated to approximate molecular weight of 730; and 160 grams of Polyol G. A blend made of the above ingredients is mixed with 192.8 grams of polymethylene polyphenylene polyisocyanate, thereby obtaining a composition with a pot life of 5 minutes and a gel time of 6.25 minutes. Results of physical-property tests are presented below in Table V.

COMPARISON TEST E

Example 5 was repeated, except that in place of the Polyol G, there were used 112 grams of Polyol A and 48 grams of carbon black, and only 192.7 grams of polymethylene polyphenylene polyisocyanate. There resulted a paste which could not be poured; it needed to be trowelled. The physical properties are presented below in Table V.

TABLE V

|  | Example 5 | Comparison Test E |
|---|---|---|
| Tensile strength, psi. | 2200 | 1800 |
| Elongation, % | 36 | 22 |
| Hardness, Shore D | 35–33 | 60–56 |
| Izod impact, ft.-lbs. per inch, notched | 1.20 | 1.52 |
| Izod impact, ft.-lbs. per inch, unnotched | 16.8 | 5.0 |
| Heat-distortion temp., 66 psi. load, °F. | 86 | 107 |

EXPERIMENTS F, G, H, & I

Comparison Test E was repeated, except that in place of the carbon black, there were used 48 grams of different fillers, other than carbon black. Thus, in Experiment F, there were used 48 grams of a 3:1 styrene:acrylonitrile copolymer; in Experiment G, there were used 48 grams of aluminum silicate; in Experiment H, there were used 48 grams of white calcite; and in Experiment I, there were used 48 grams of titanium dioxide. Results of the experiments are presented in the following Table VI. "S-AN" means "Styrene-Acrylonitrile".

TABLE VI

| Experiment Filler Added | F S-AN Copolymer | G Aluminum Silicate | H White Calcite | I Titanium Dioxide |
|---|---|---|---|---|
| Pot life, min. | 5 | 5 | 5 | 5 |
| Gel time, min. | 7 | 8 | 10 | 9 |
| Tensile strength, psi. | 1100 | 1400 | 670 | 1100 |
| Elongation, % | 26 | 30 | 28 | 37 |
| Hardness, Shore D | 52–49 | 51–44 | 47–43 | 40–36 |
| Izod impact, ft.-lb. per inch, notched | 0.6 | 0.84 | 1.07 | 1.16 |
| Izod impact, ft.-lb. per inch, unnotched | 4.3 | 6.6 | 7.0 | 10.2 |
| Heat-distortion temp., 66 psi load, °F. | 106 | 102 | 78 | 84 |

TESTS J, K, L & M

Example 1 was repeated, except that in place of Polyol C, there was used instead Polyol A or Polyol B. Thus, in Test J, there were used 160 grams of Polyol A and 270.8 grams of polymethylene polyphenylene polyisocyanate. The pot life was four minutes and the gel time was six minutes. Other properties are presented below in Table VII. In Test K, there were used 160 grams of Polyol B and 278 grams of polymethylene polyphenylene polyisocyanate. The pot life was 4.25 minutes and the gel time was 4.75 minutes. The other properties are presented below in Table VII.

In Test L, there were used 200 grams of Polyol A and 274.1 grams of polymethylene polyphenylene polyisocyanate. The pot life was 4.5 minutes and the gel time was 5.75 minutes. The physical properties are presented below in Table VII.

In Test M, there were used 200 grams of Polyol B and 288.9 grams of polymethylene polyphenylene polyisocyanate. The pot life was 4.75 minutes and the gel time was 6 minutes. The physical properties are presented below in Table VII.

TABLE VII

| Experiment | J | K | L | M |
|---|---|---|---|---|
| Tensile strength, psi. | 5800 | 5900 | 4600 | 5000 |
| Elongation, % | 11.4 | 11.9 | 14.2 | 17.1 |
| Hardness, Shore D | 46 | 50 | 54 | 54-38 |
| Izod impact, ft.-lb. per inch, notched | 0.88 | 0.71 | 0.72 | 1.0 |
| Izod impact, ft.-lb. per inch, unnotched | 5.9 | 5.5 | 8.8 | 8.1 |
| Heat-distortion temp., 66 psi. load, °F. | 181 | 217 | 155 | 162 |

In Experiment M, two values are reported for the Shore D hardness. The higher one was an initial determination, and the lower one was from a determination after 5 minutes of applied pressure. Similar tests (initial and after 5 minutes) were conducted in the Experiments J, K, and L, but the values did not differ substantially.

While we have shown and described herein certain embodiments of our invention, we intend to cover as well any change or modification therein which may be made without departing from its spirit and scope.

The embodiments of the invention in which an exclusive property or privilege is claimed are as follows:

1. A polyurethane composition, castings of which have high strength, characterized in that said composition is one resulting from the reaction of a polyisocyanate with a blend of polyether polyols, wherein a major portion of said blend comprises polyether polyols selected from the group consisting of those having a hydroxyl number of 400 to 1000 and a functionality of 3-4, and a portion, effective to improve substantially the strength of said polyurethane composition, of said blend comprises a graft polyol which is liquid and pourable at ambient temperature and is a product of the free-radical-catalyzed polymerization of at least one ethylenically unsaturated monomer with a polyol which contains carbon-carbon unsaturation and oxyalkylene moieties and which has an average molecular weight on the order of 300 to 10,000.

2. A composition as defined in claim 1, wherein said polyisocyanate is polymethylene polyphenylene polyisocyanate.

3. A composition as defined in claim 2, wherein said graft polyol is the product of the copolymerization of a mixture of acrylonitrile and styrene, said mixture containing at least 20 percent of each, with said polyol containing carbon-carbon unsaturation.

4. A composition as defined in claim 3, wherein said polyol containing carbon-carbon unsaturation is one containing oxyalkylene units and units derived from allylglycidyl ether.

5. A composition as defined in claim 4, wherein said polyol containing carbon-carbon unsaturation is one containing oxypropylene units and units derived from allylglycidyl ether.

6. A composition as defined in claim 2, wherein said polyol containing carbon-carbon unsaturation is one containing oxyalkylene units and units derived from allylglycidyl ether.

7. A composition as defined in claim 6, wherein said polyol containing carbon-carbon unsaturation is one containing oxypropylene units and units derived from allylglycidyl ether.

8. A composition as defined in claim 1, wherein said graft polyol is a product of the copolymerization of a mixture of acrylonitrile and styrene, said mixture containing at least 20 percent of each, with said polyol containing carbon-carbon unsaturation.

9. A castable polyurethane composition according to claim 1, characterized in that said composition further contains a substantial proportion of a filler material selected from the group consisting of styrene-acrylonitrile copolymer, aluminum silicate, white calcite, and titanium dioxide.

10. A heat flow barrier comprising a polyurethane composition, said composition prepared by the reaction of a polyisocyanate with a blend of polyether polyols, wherein a major portion of said blend comprises polyether polyols selected from the group consisting of those having a hydroxyl number of 400 to 1000 and a functionality of 3 to 4, and a portion of said blend comprises a graft polyol prepared by the free radical catalyzed polymerization of at least one ethylenically unsaturated monomer with a polyol which contains carbon-carbon unsaturation having a molecular weight range of 300 to 10,000.

11. The heat flow barrier of claim 1 wherein said polyisocyanate is polymethylene polyphenylene polyisocyanate.

12. The heat flow barrier of claim 11 wherein said graft polyol is the product of the copolymerization of a mixture of acrylonitrile and styrene, said mixture containing at least 20 percent of each, with said polyol containing carbon-carbon unsaturation.

13. The heat flow barrier of claim 11 wherein said polyol containing carbon-carbon unsaturation is one containing oxyalkylene units and units derived from allylglycidyl ether.

14. The heat flow barrier of claim 11 wherein said polyol containing carbon-carbon unsaturation is one containing oxypropylene units and units derived from allylglycidyl ether.

* * * * *